US009280530B2

(12) United States Patent
Farinacci

(10) Patent No.: US 9,280,530 B2
(45) Date of Patent: *Mar. 8, 2016

(54) DISPLAY OF USER COMMENTS TO TIMED PRESENTATION

(71) Applicant: International Business Machines Corporation, Armonk, NY (US)

(72) Inventor: Jesse L. Farinacci, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/502,086

(22) Filed: Sep. 30, 2014

(65) Prior Publication Data

US 2015/0019950 A1 Jan. 15, 2015

Related U.S. Application Data

(63) Continuation of application No. 13/868,507, filed on Apr. 23, 2013.

(51) Int. Cl.

| | |
|---|---|
| *G06F 3/00* | (2006.01) |
| *G06F 17/24* | (2006.01) |
| *G06F 3/0484* | (2013.01) |
| *G06F 9/44* | (2006.01) |
| *G06Q 10/00* | (2012.01) |
| *G06F 15/02* | (2006.01) |

(52) U.S. Cl.
CPC ............ *G06F 17/241* (2013.01); *G06F 3/0484* (2013.01); *G06F 9/44* (2013.01); *G06Q 10/00* (2013.01); *G06F 15/0283* (2013.01)

(58) Field of Classification Search
CPC . G06F 17/30056; G06F 3/048; G06F 17/241; G06F 15/0283
See application file for complete search history.

(56) References Cited

U.S. PATENT DOCUMENTS

| | | | | |
|---|---|---|---|---|
| 5,727,129 | A * | 3/1998 | Barrett et al. .................... | 706/10 |
| 8,775,948 | B2 * | 7/2014 | Ark ......................... | G06Q 10/10 715/753 |
| 2004/0002049 | A1 * | 1/2004 | Beavers .................... | G09B 5/00 434/350 |
| 2007/0055961 | A1 * | 3/2007 | Callister ................. | G06F 8/445 717/136 |
| 2007/0136748 | A1 * | 6/2007 | Rodriguez ........... | H04N 21/235 725/37 |
| 2009/0007179 | A1 * | 1/2009 | Angiolillo ............ | H04N 5/4403 725/44 |
| 2010/0037149 | A1 * | 2/2010 | Heath ........................... | 715/753 |
| 2010/0257449 | A1 * | 10/2010 | Lieb ........................ | H04L 67/02 715/730 |
| 2011/0010628 | A1 * | 1/2011 | Segal ..................... | G06F 3/0488 715/730 |
| 2011/0258545 | A1 | 10/2011 | Hunter | |
| 2012/0033948 | A1 * | 2/2012 | Rodriguez ............. | G11B 27/34 386/282 |
| 2012/0150997 | A1 | 6/2012 | McClements, IV | |
| 2012/0311618 | A1 | 12/2012 | Blaxland | |
| 2013/0298025 | A1 * | 11/2013 | Lewis et al. .................... | 715/720 |
| 2014/0081904 | A1 * | 3/2014 | Sitrick ................... | G06F 17/212 707/608 |
| 2014/0089801 | A1 * | 3/2014 | Agrawal ............... | G06F 3/0484 715/719 |
| 2014/0136626 | A1 * | 5/2014 | Teevan ................... | G09B 5/125 709/205 |
| 2014/0250463 | A1 * | 9/2014 | Barton ............... | G06Q 30/0241 725/42 |
| 2014/0325557 | A1 * | 10/2014 | Evans ................ | H04N 21/4788 725/34 |

OTHER PUBLICATIONS

Chu et al., Tiling Slideshow: An Audiovisual Presentation Method for Consumer Photos; © 2007; IEEE; 10 Pages.*
Johri et al., Creating a Participatory Learning Environment in Large Lecture Classes Using Pen-Based Computing; published 2008; Virgia Tech; 8 pages.*
Kamabathula et al., automated Tagging to Enable fine-Grained Browsing of Lexture Videos, © 2011; IEEE; 7 pages.*

* cited by examiner

*Primary Examiner* — Linh K Pham
(74) *Attorney, Agent, or Firm* — Cantor Colburn LLP; William A. Kinnaman, Jr.

(57) ABSTRACT

A method and system to dynamically display a presentation of a time duration are described. The system includes a processor to receive comments associated with the presentation, the comments arranged in a first ordering, to identify a time reference comment among the comments, the time reference comment including a time reference referencing a time instant within the time duration of the presentation, and to dynamically change an ordering of the comments from the first ordering to a second ordering at the time instant. The system also includes a display device to display the presentation with the comments, the comments arranged according to the ordering.

8 Claims, 7 Drawing Sheets

DISPLAY OF USER COMMENTS TO TIMED PRESENTATION

This application is a continuation of U.S. application Ser. No. 13/868,507 filed Apr. 23, 2013, the disclosure of which is incorporated by reference herein in its entirety.

BACKGROUND

The present invention relates to timed presentations, and more specifically, to the display of user comments associated with timed presentations.

Several social media and other types of websites include presentations (e.g., music output, video displays) lasting varying lengths of time. These websites often facilitate the input of user comments associated with the presentations. In addition, user comments may be sorted by a vote-based process. Sometimes the user comments pertain to a specific time within the presentation. However, the current organization and display of user comments may result in a viewer completing the entire presentation, then seeing the comment specifying a time within the presentation, and subsequently having to go back to the presentation to find the time pertaining to the comment. The process of re-starting the presentation to find the time pertaining to a comment may be frustrating to the viewer, especially when the presentation is data intensive and slow to load.

SUMMARY

According to an embodiment of the invention, a system to dynamically display a presentation of a time duration includes a processor to receive comments associated with the presentation, the comments arranged in a first ordering, to identify a time reference comment among the comments, the time reference comment including a time reference referencing a time instant within the time duration of the presentation, and to dynamically change an ordering of the comments from the first ordering to a second ordering at the time instant; and a display device configured to display the presentation with the comments, the comments arranged according to the ordering.

According to another embodiment of the invention, a computer program product to dynamically display a presentation of a time duration comprises a computer readable storage medium having program code embodied therewith that is readable and executable by a processor to perform a method. The method includes receiving comments associated with the presentation, the comments arranged in a first ordering; identifying a time reference comment among the comments, the time reference comment including a time reference, the time reference referencing a time instant within the time duration of the presentation; and dynamically changing a display of the comments from the first ordering to a second ordering at the time instant.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

As noted above, user comments associated with presentations are currently displayed such that the most pertinent comments associated with the portion of the presentation currently being presented are not highlighted or sometimes even visible based on the screen sizing. When the comments are reviewed after the presentation is completed and one or more of them is of interest, re-loading the presentation may be a frustrating experience. For example, the presentation may be a six minute forty-two second (6:42) video of Heart performing "Stairway to Heaven" at the Led Zeppelin Kennedy Center Honors, and one of the comments, listed toward the bottom of the set of comments associated with the video, may be "Yo Yo Ma has a great reaction at 4:17." If a viewer saw the entire 6:42 video, then saw the comment and was interested to see the reaction at 4:17, he or she would have to replay the video and forward to the time of interest, 4:17. Embodiments of the system and method described herein relate to dynamically organizing the user comments throughout viewing so that the most pertinent comments are placed within view during viewing of the presentation. While the embodiments are described with reference to a video display for explanatory purposes, the embodiments apply, as well, to any type of presentation.

Figure 1:
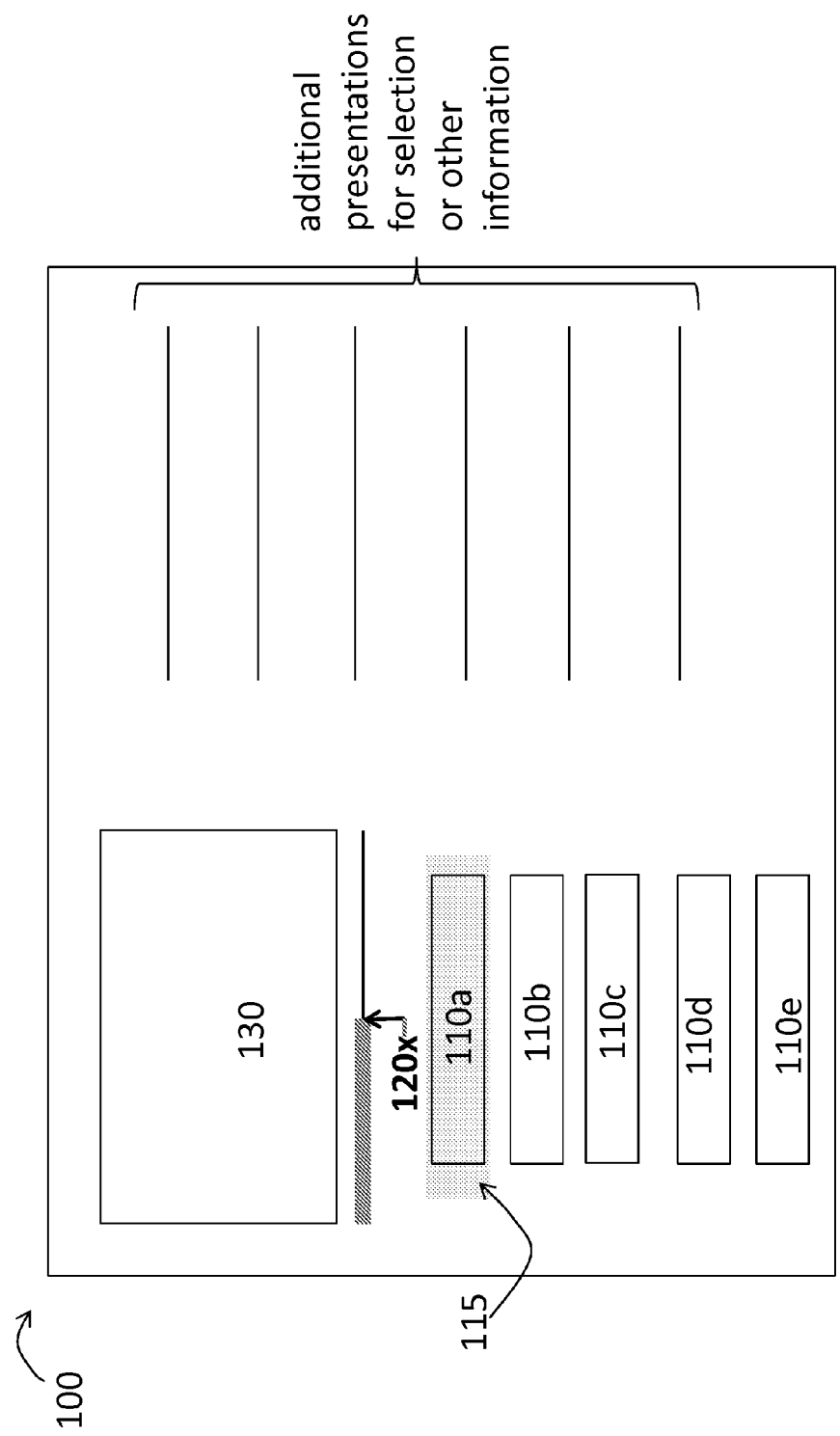
FIG. 1 is an exemplary display at one presentation time instant according to embodiments of the invention.

FIG. 1 is an exemplary display 100 at one presentation time instant 120$x$ according to embodiments of the invention. The exemplary display 100 shown in FIG. 1 includes the selected video presentation 130 at a time instant 120$x$. At this time instant, the ordering of the comments 110 associated with the video presentation 130 is as shown. Assuming, for the sake of example, that there are no comments 110 referring to time instant 120$x$, the ordering of the comments 110 may be based strictly on viewer voting. While the ordering of comments 110 based on viewer voting is discussed as an exemplary initial or default ordering, the default ordering of the comments 110 may instead be based on any basis (e.g., chronologically based on time of submission of the comment, by number of misspellings, based on key words such as identified foul language). That is, the comment 110$a$, closest to the video presentation 130 and in an area 115 that is highlighted in some way, is the one that received the highest number of viewer votes according to a voting system built into the display 100. The area 115 may be highlighted by a specific color border around the comment 110$a$ or in another visually apparent way. The comment 110$e$ received the lowest number of viewer votes among the comments 110 shown in the display 100. That is, there may be additional comments 110 below 110e that are not visible without scrolling down the display 100 and thereby losing a view of the video presentation 130.

Figure 2:
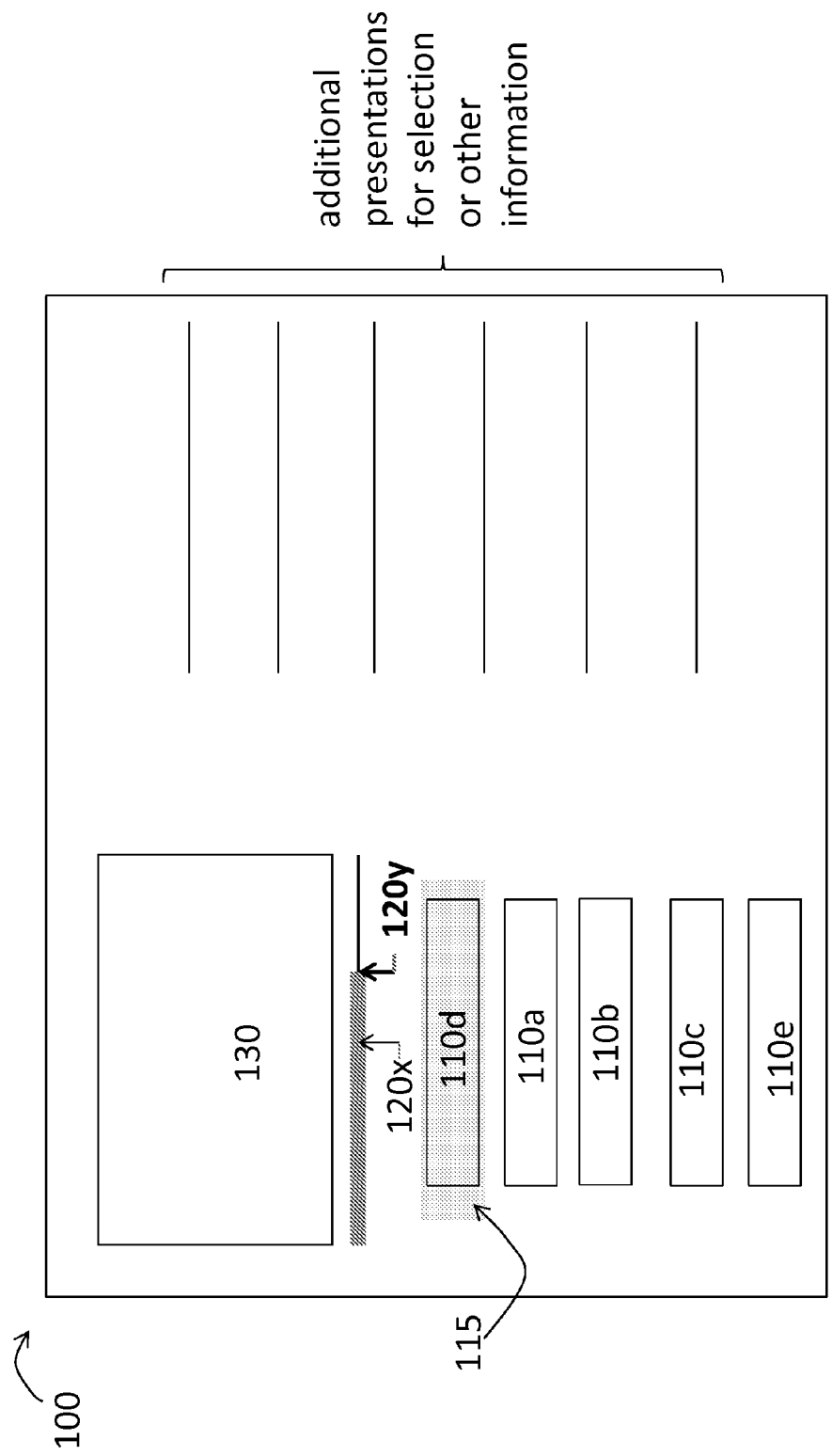
FIG. 2 is an exemplary display at another presentation time instant according to embodiments of the invention.

FIG. 2 is an exemplary display 100 at another presentation time instant 120y according to embodiments of the invention. The exemplary display 100 is of the same video presentation 130 as in the example of FIG. 1 at a time instant 120y after the time instant 120x shown by FIG. 1. Assuming that comment 110d refers specifically to time instant 120y, the arrangement of the comments 110 would be as shown in FIG. 2 for some period of time before the time instant 120y until some period of time after the time instant 120y. The period of time during which the comments are arranged as shown in FIG. 2 may be five seconds before time instant 120y to five seconds after time instant 120y, for example. In alternate embodiments, the period of time may be some percentage of the total time of the presentation. That is, the comments may be arranged as shown in FIG. 2 for 7% of the total duration of the presentation before time instant 120y to 7% of the total duration of the presentation after time instant 120y. The period of time may also be determined by a specified algorithm or based on the display device or by some other criteria. Further, the period of time before and after the time instant 120y need not be the same. The exemplary discussion of five seconds before and after time instant 120y is not intended to limit the criteria for selecting the period of time in any way. In the exemplary case, starting at five seconds before time instant 120y and lasting until five seconds after time instant 120y, the comment 110d, which specifically references time instant 120y, is arranged to be closest to the video presentation 130 in the highlighted area 115. In the exemplary case shown in FIGS. 1 and 2, no comments 110 other than comment 110d reference a time within the duration of the video presentation 130. Thus, the remaining comments (110b-110c and 110e) are arranged in the same relative order as they were in FIG. 1 (by vote) during the period of time around time instant 120y, and the comments 110 are then arranged as shown in FIG. 1 for all other times during the video presentation 130.

Figure 3:
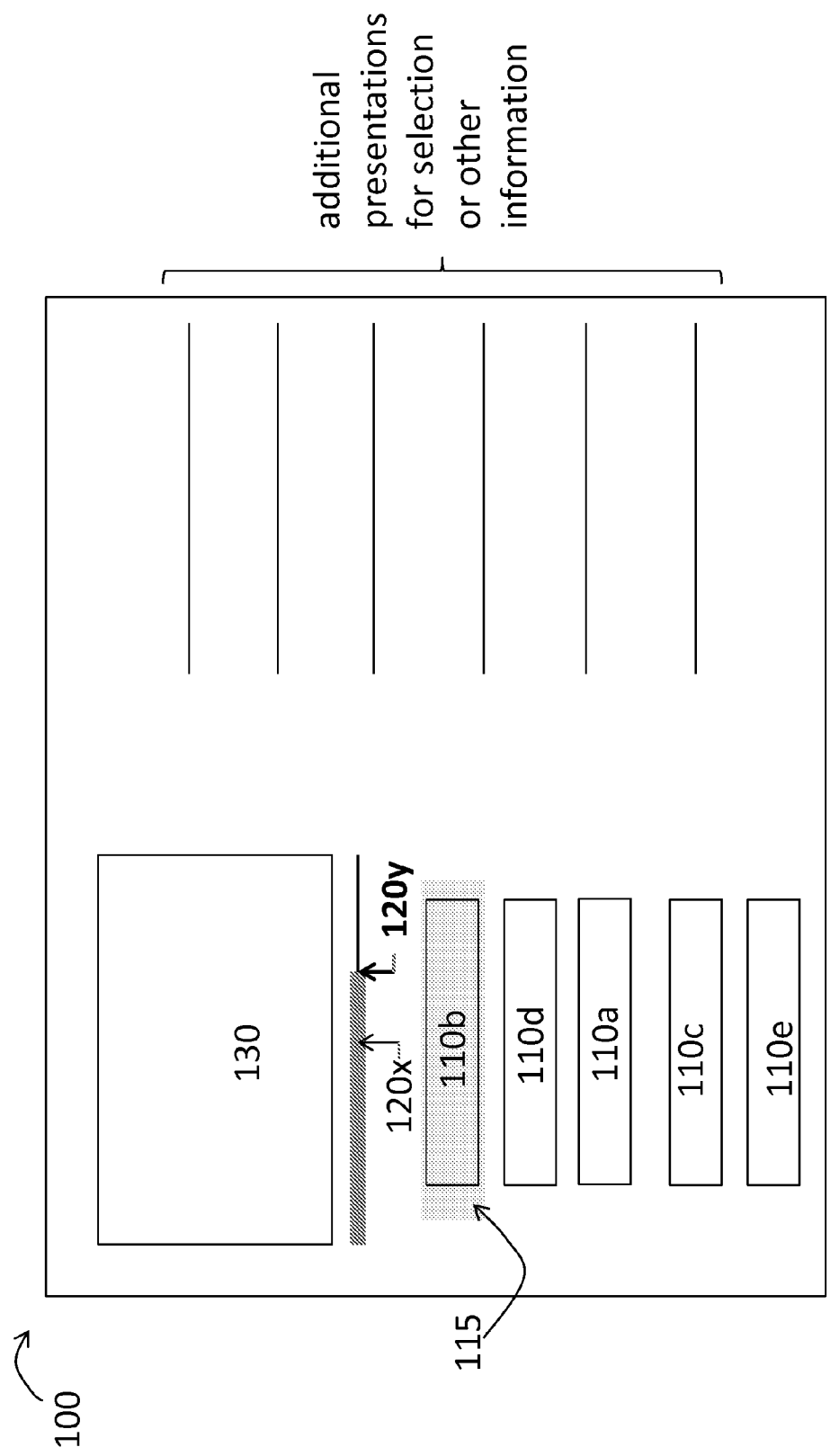
FIG. 3 is an exemplary display at a presentation time instant according to embodiments of the invention.

FIG. 3 is an exemplary display 100 at presentation time instant 120y according to embodiments of the invention. According to the example associated with FIG. 2, more than one comment 110 references time instant 120y (110d and 110b). In this case, as shown at FIG. 3, both comments 110d and 110b are moved to the top of the list of comments 110 during the period of time around time instant 120y. The relative order among comments 110d and 110b may be based on their corresponding viewer vote, for example. That is, when both comment 110d and comment 110b reference time instant 120y, then whichever comment (110d or 110b) had the highest viewer votes would be listed first (within area 115). In the example shown at FIG. 3, comment 110b references time instant 120y and has more viewer votes than comment 110d. The remaining comments (110a, 110c, 110e) may be ordered according to viewer votes. The exemplary criteria for ordering (viewer votes) discussed above is intended to be explanatory but not limiting. When more than one comment 110 references the same time instant 120 (e.g., comments 110d and 110b reference time instant 120y), then some other criteria may be used as the "tie breaker" between the comments 110 (e.g., 110d and 110b). For example, comment 110d may have been input before comment 110b and is, therefore, displayed within area 115 closer to the presentation 130 because it is chronologically earlier. Any other criteria may be used instead.

Figure 4:
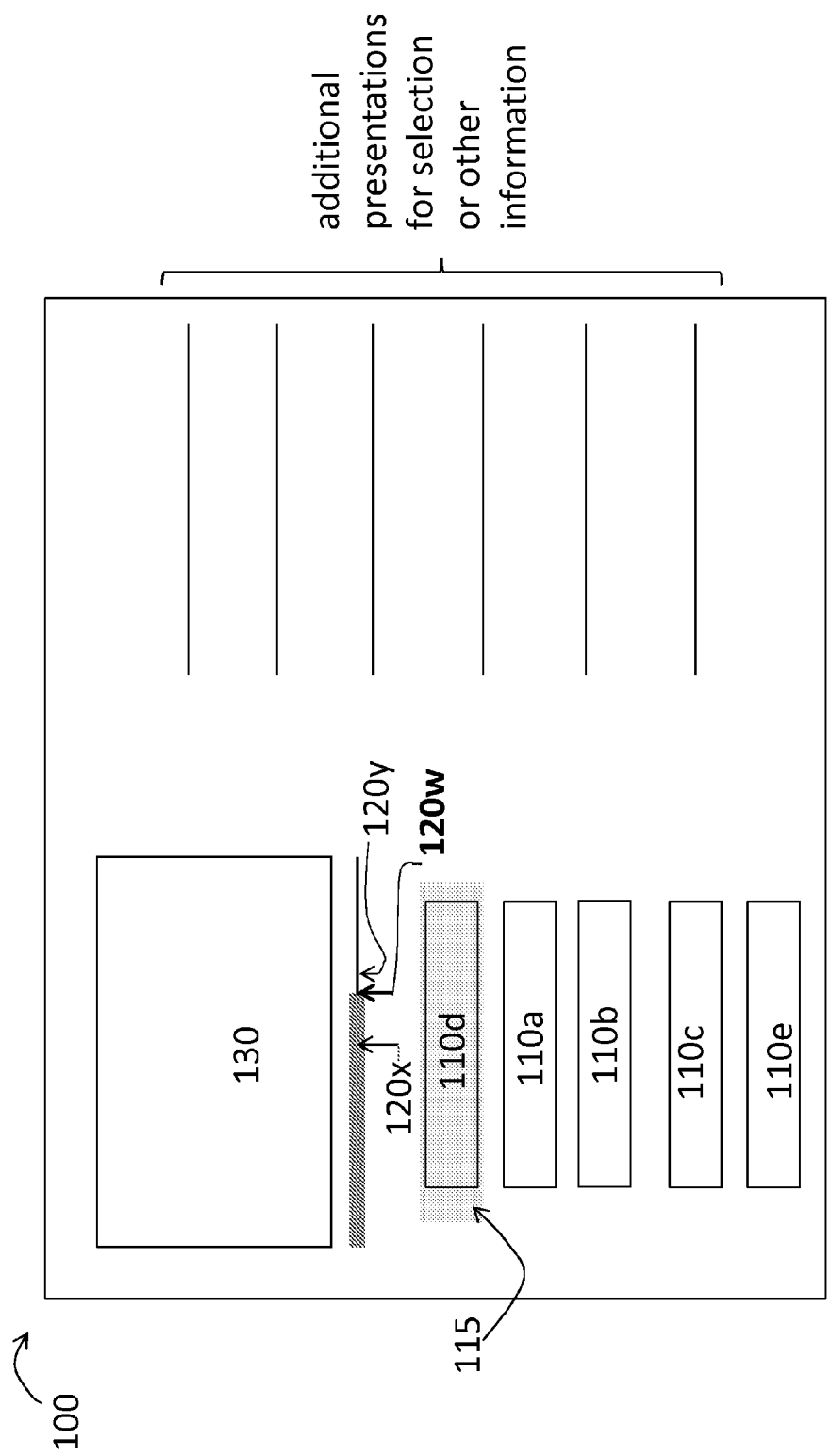
FIG. 4 is an exemplary display at a presentation time instant according to embodiments of the invention.
Figure 5:
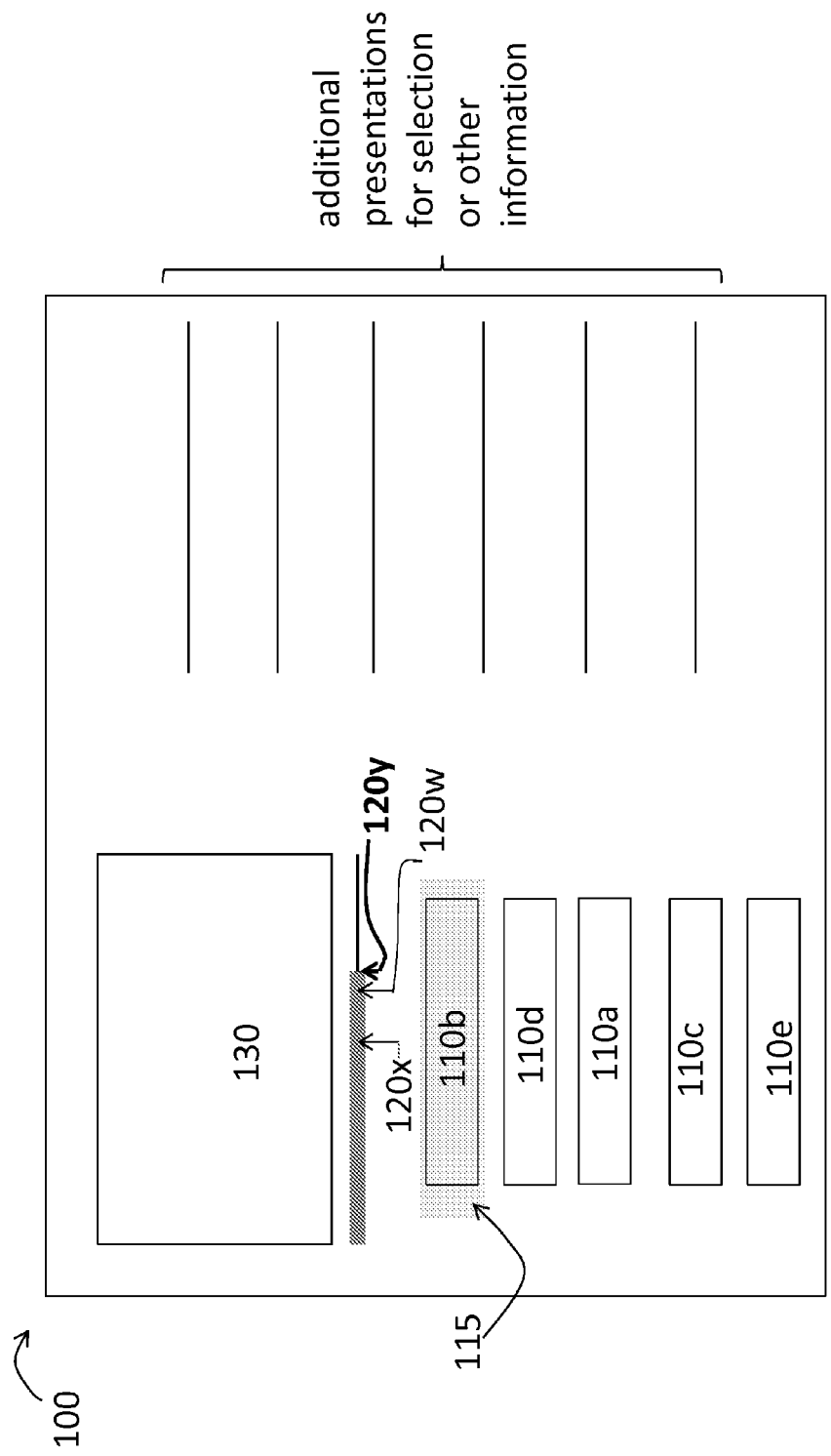
FIG. 5 is an exemplary display at a presentation time instant according to embodiments of the invention.

FIG. 4 is an exemplary display 100 at presentation time instant 120w according to embodiments of the invention. FIGS. 4 and 5 relate to an example in which comment 110b references time instant 120y and comment 110d references time instant 120w, which, for the sake of example, is 2 seconds prior to time instant 120y. In the example, viewer votes are used as the exemplary criteria for initial or default ordering of the comments 110, and 5 seconds before and after the time instant 120 referenced by a comment is used as the exemplary period of time during which ordering of the comments 110 is changed. The example assumes that comment 110b has more viewer votes than comment 110d. Comment 110d would be in the area 115 for five seconds preceding time instant 120w through time instant 120w, as shown in FIG. 4. FIG. 5 is an exemplary display 100 at presentation time instant 120y according to embodiments of the invention. After time instant 120w, comment 110b (having more viewer votes) would move to the area 115 and, for 3 seconds after time instant 120y (which is 5 seconds after time instant 120x), comment 110d (which references time instant 120w) would be the next comment displayed, as shown in FIG. 5. Then, 5 seconds after time instant 120y, the comments 110 would be arranged as shown in FIG. 1 again (based solely on viewer votes).

In alternate embodiments, a different voting scheme may be adopted that associates votes with time periods within a presentation. Thus, based on the voting scheme used by the system displaying the video presentation 130, comments 110a, 110b, 110c, and 110e may be ordered differently in, for example, FIG. 2 (below time referencing comment 110d) than in FIG. 1. While time instants 120x, 120w, and 120y are specifically discussed with reference to FIGS. 1 through 5, rearrangements of the comments 110 may be presented any number of times during the viewing of the video presentation 130 based on the comments 110 and any times references by the comments 110.

Figure 6:
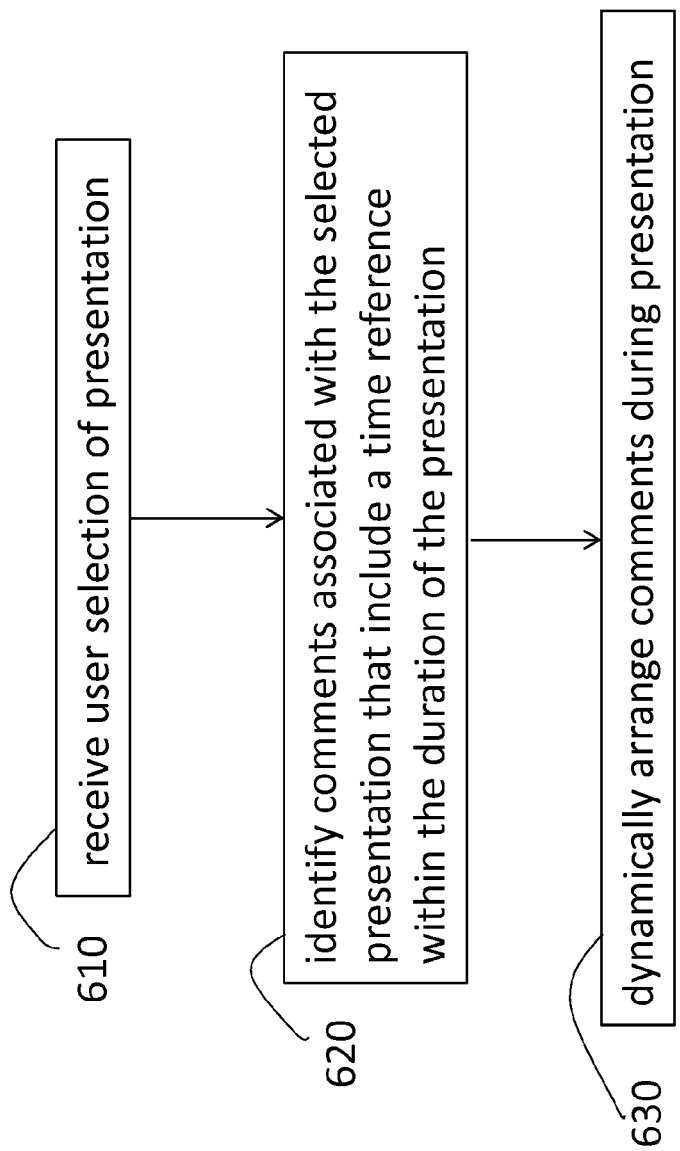
FIG. 6 is a process flow of an exemplary method of displaying a presentation according to an embodiment of the invention.

FIG. 6 is a process flow of an exemplary method of displaying a presentation according to an embodiment of the invention. At block 610, receiving a user selection of a presentation may include receiving a selection of a video presentation 130 or another type of presentation. At block 620, the method includes identifying comments 110 associated with the selected presentation that include a time reference within the duration of the presentation. The identifying comments 110 that include a time reference within the duration of the presentation may be done in a number of ways. A text search may be conducted to look for the ":" in time reference comments 110, for example. Meta data may be stored for the comments 110, and time may be one of the meta data categories. That is, once identified, the text including ":" may be processed to extract the time reference and the time meta data updated to include that time reference. By extracting the time information, a determination may be made as to whether the reference is to a time within the duration of the presentation 130. For example, a comment 110 stating "the solo at 4:17 is great" for a presentation of 7 minutes (or any length greater than 4 minutes and 17 seconds) would be identified. However, a comment 110 stating "I wish this lasted 10 minutes" associated with a presentation lasting less than 10 minutes may not be identified. At block 630, dynamically arranging comments 110 during the presentation includes rearranging the order of the comments 110 as described with reference to FIGS. 1 through 5, for example. For some duration (e.g., 5 seconds) before and after a time referenced within one of the comments 110 identified at block 620, the comment 110 including the time reference would be moved to an area 115 in which the user viewing the presentation is likely to see the comment 110. After the duration, the arrangement of the comments 110 may change by reverting back to an arrangement based on viewer votes or based on another comment referencing a subsequent time instant of the presentation.

Figure 7:
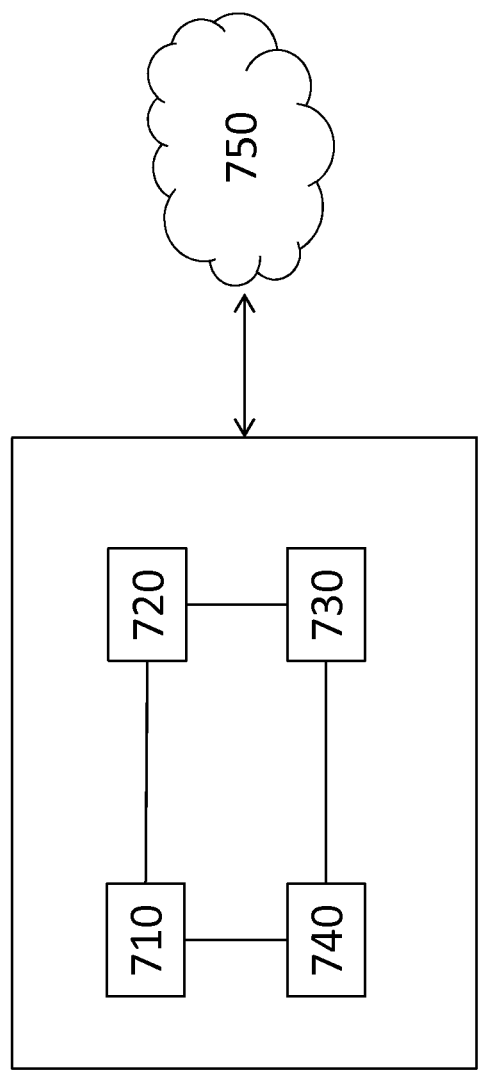
FIG. 7 is a block diagram of an exemplary system to display a presentation according to an embodiment of the invention.

FIG. 7 is a block diagram of an exemplary system to display a presentation according to an embodiment of the invention. The system may include one or more processors 410 and one or more memory devices 720, as well as an input interface 730 and an output interface 740. The user selection of a particular presentation may be received through the input interface 730 via a wireless network 750 or other connection. The one or more processors 710 using instructions and information stored within the one or more memory devices 720 dynamically arrange the comments 110 and provide output via the output interface 740. The processor 710 may arrange the comments 110 as discussed above with reference to FIGS. 1 through 5. The system may output the display to a display device or, in alternate embodiments, may output data for display through the output interface 740 through the network 750 to another system for display.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagram depicted herein is just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A system to dynamically display a presentation of a time duration, the system comprising:
    a processor configured to receive comments associated with the presentation, the comments arranged in a first ordering, to identify a time reference comment among the comments, the time reference comment including a time reference referencing a time instant within the time duration of the presentation, and to dynamically change an ordering of the comments from the first ordering to a second ordering at the time instant, the second ordering of the comments representing a rearrangement of the first ordering of the comments; and
    a display device configured to display the presentation with the comments, the comments arranged according to the ordering, wherein the display device shows the comments according to the second ordering beginning at a first specified time length before the time instant until a second specified time length after the time instant based on the processor, and the processor changes an ordering of the comments back to the first ordering after the second specified time length after the time instant.

2. The system according to claim 1, wherein the processor moves the time reference comment in the second order to an end of a listing of the comments that is closest to the presentation.

3. The system according to claim 1, wherein, based on the second ordering, the display device shows the time reference comment in an area that is highlighted with respect to others of the comments during the time instant.

4. The system according to claim 1, wherein the processor identifies a second time reference comment among the comments, the second time reference comment including a second time reference referencing a second time instant within the time duration of the presentation, and generates a third ordering of the comments at the second time instant, and the display device shows the comments in the third ordering at the second time instant.

5. A non-transitory computer program product to dynamically display a presentation of a time duration, the computer program product comprising a computer readable storage medium having program code embodied therewith, the program code being readable and executable by a processor to perform a method comprising:
    receiving comments associated with the presentation, the comments arranged in a first ordering;
    identifying a time reference comment among the comments, the time reference comment including a time reference, the time reference referencing a time instant within the time duration of the presentation;
    dynamically changing a display of the comments from the first ordering to a second ordering at the time instant, the second ordering of the comments representing a rearrangement of the first ordering of the comments, wherein the changing the display begins a first specified time length before the time instant and lasts until a second specified time length after the time instant; and
    changing the display of the comments back to the first ordering after the second specified time length after the time instant.

6. The computer program product according to claim 5, wherein the changing the display to the second ordering includes moving the time reference comment to an end of a listing of the comments that is closest to the presentation.

7. The computer program product according to claim 6, wherein the moving the time reference comment includes moving the time reference comment to an area that is highlighted with respect to others of the comments.

8. The computer program product according to claim 5, further comprising identifying a second time reference comment among the comments, the second time reference comment including a second time reference, the second time reference referencing a second time instant within the time duration of the presentation, and dynamically changing a display of the comments to a third ordering at the second time instant.

\* \* \* \* \*